(12) United States Patent
Hirano

(10) Patent No.: US 10,459,306 B2
(45) Date of Patent: Oct. 29, 2019

(54) OPTICAL ELEMENT

(71) Applicant: STANLEY ELECTRIC CO., LTD., Meguro-ku, Tokyo (JP)

(72) Inventor: Tomoya Hirano, Kawasaki (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 43 days.

(21) Appl. No.: 15/921,799

(22) Filed: Mar. 15, 2018

(65) Prior Publication Data

US 2018/0275476 A1 Sep. 27, 2018

(30) Foreign Application Priority Data

Mar. 22, 2017 (JP) ................................. 2017-055894

(51) Int. Cl.
| | |
|---|---|
| *G02F 1/155* | (2006.01) |
| *G02F 1/1506* | (2019.01) |
| *G02F 1/153* | (2006.01) |
| *F21K 2/08* | (2006.01) |
| *G02F 1/157* | (2006.01) |
| *G02F 1/163* | (2006.01) |

(Continued)

(52) U.S. Cl.
CPC ............... *G02F 1/155* (2013.01); *F21K 2/08* (2013.01); *G02F 1/1506* (2013.01); *G02F 1/157* (2013.01); *G02F 1/1533* (2013.01); *G02F 1/163* (2013.01); *G02F 1/19* (2013.01); *F21V 3/061* (2018.02); *G02F 2001/1518* (2019.01)

(58) Field of Classification Search
CPC .......... G02F 1/155; G02F 1/163; G02F 1/157; G02F 1/19; G02F 1/1533; G02F 1/1506; G02F 2001/1518; F21K 2/08; F21V 3/061

USPC ................................... 359/265–275; 345/105
See application file for complete search history.

(56) References Cited

U.S. PATENT DOCUMENTS

| | | |
|---|---|---|
| 7,903,314 B2 | 3/2011 | Nakaho et al. |
| 9,091,895 B2 | 7/2015 | Bergh et al. |

(Continued)

FOREIGN PATENT DOCUMENTS

| | | |
|---|---|---|
| EP | 2083318 A1 | 7/2009 |
| JP | 2004170613 A | 6/2004 |

(Continued)

OTHER PUBLICATIONS

Extended European Search Report dated Jun. 18, 2018 issued in European Application No. 18163027.8.

*Primary Examiner* — Tuyen Tra
(74) *Attorney, Agent, or Firm* — Holtz, Holtz & Volek PC

(57) ABSTRACT

An optical element comprises a first electrode; a second electrode partially including insulating areas; a seal frame member located between the first electrode and the second electrode; an electrolyte layer that fills a space defined by the first substrate, the second substrate, and the seal frame member; a first connection electrode disposed outside the seal frame member on the surface of the first substrate facing the second substrate; and a second connection electrode disposed outside the seal frame member on the surface of the second substrate facing the first substrate, wherein, in an area surrounded by the seal frame member, a proportion of the insulating areas of the second electrode included in an unit area relatively close to the first connection electrode is higher than that included in an unit area positioned in the middle of the seal frame member.

10 Claims, 8 Drawing Sheets

(51) Int. Cl.
  *G02F 1/19* (2019.01)
  *F21V 3/06* (2018.01)
  *G02F 1/1516* (2019.01)

(56) References Cited

U.S. PATENT DOCUMENTS

| | | |
|---|---|---|
| 9,110,346 B2 * | 8/2015 | Tsai ................. G02F 1/155 |
| 9,606,411 B2 | 3/2017 | Bergh et al. |
| 10,001,689 B2 | 6/2018 | Bergh et al. |
| 2009/0185256 A1 | 7/2009 | Nakaho et al. |
| 2014/0043667 A1 | 2/2014 | Bergh et al. |
| 2015/0131139 A1 * | 5/2015 | Tsukamoto ........... G02F 1/155 |
| | | 359/266 |
| 2016/0170278 A1 | 6/2016 | Bergh et al. |
| 2017/0192333 A1 | 7/2017 | Bergh et al. |

FOREIGN PATENT DOCUMENTS

| | | |
|---|---|---|
| JP | 2007134143 A | 5/2007 |
| JP | 2012181389 A | 9/2012 |

\* cited by examiner

OPTICAL ELEMENT

CROSS REFERENCE TO RELATED APPLICATION

This application is based on and claims priority on Japanese Patent Application 2017-055894, filed on Mar. 22, 2017, the entire contents of which are incorporated herein by reference.

FIELD OF THE INVENTION

The present invention relates to an optical element capable of switching between at least two optical states.

BACKGROUND

Optical elements have been proposed that are capable of switching optical states.

Japanese Laid-open Patent Publication No. 2012-181389 discloses a so-called electrodeposition element. The electrodeposition element mainly includes a pair of transparent electrodes arranged opposite each other and an electrolyte layer held between the pair of transparent electrodes, the electrolyte layer containing an electrodeposition material including silver. The electrodeposition element typically has a planar size of about 10 $mm^2$.

The electrolyte layer is substantially transparent, and the electrodeposition element is in transparent state at steady state (while no voltage is applied). When a voltage is applied between the pair of transparent electrodes, an electrochemical reaction (an oxidation-reduction reaction) occurs which causes the electrodeposition material (silver) in the electrolyte layer to be precipitated and deposited on one of the electrodes. The electrodeposition material, when precipitated and deposited on a surface of one of the electrodes that is comparatively planar, forms a mirror surface, and the electrodeposition element is brought into a mirror surface (high light reflecting) state.

Japanese Laid-open Patent Publication No. 2007-134143 discloses a so-called electrochemical luminescent element. The electrochemical luminescent element includes a pair of substrates, a pair of transparent electrodes, and a layer held between the pair of transparent electrodes and including an electrochemical luminescent material. Upon application of voltage, excitation and deactivation of the cation radical and anion radical occur, which results in emission of light.

Japanese Laid-open Patent Publication No. 2004-170613 discloses a so-called electrochromic element. The electrochromic element includes a pair of substrates, a pair of transparent electrodes, and a layer held between the pair of transparent electrodes and including an electrochromic material. Upon application of voltage, due to an electrochemical reaction, the electrochromic material changes its molecular structure, causing discoloration.

SUMMARY

According to a main aspect of this invention, there is provided an optical element comprising: a first substrate that is optically transmissive; a second substrate facing the first substrate; a first electrode disposed on a surface of the first substrate, the surface facing the second substrate, the first electrode being a light-transmitting electrode; a second electrode disposed on a surface of the second substrate, the surface facing the first substrate, the second electrode partially including insulating areas; a seal frame member located between the first electrode and the second electrode, the seal frame member having a frame shape when viewed in a direction normal to the first substrate and the second substrate; an electrolyte layer that fills a space defined by the first substrate, the second substrate, and the seal frame member, an optical state of the electrolyte layer being capable of changing due to an electrochemical reaction on a surface of the first electrode and a surface of the second electrode; a first connection electrode disposed outside the seal frame member on the surface of the first substrate facing the second substrate, the first connection electrode being connected to the first electrode, the first connection electrode having a lower electrical resistivity than the first electrode; and a second connection electrode disposed outside the seal frame member on the surface of the second substrate facing the first substrate, the second connection electrode being connected to the second electrode, wherein, when viewed in the direction normal to the first substrate and the second substrate, in an area surrounded by the seal frame member, a proportion of the insulating areas of the second electrode included in an unit area relatively close to the first connection electrode is higher than that included in an unit area positioned in the middle of the seal frame member.

The object and advantages of the invention will be realized and attained by means of the elements and combinations particularly pointed out in the claims.

It is to be understood that both the foregoing general description and the following detailed description are exemplary and are not restrictive of the invention, as claimed.

DESCRIPTION OF THE PREFERRED EMBODIMENTS

First, a basic structure of an electrodeposition element (ED element) according to a reference example will be described.

Figure 1A:
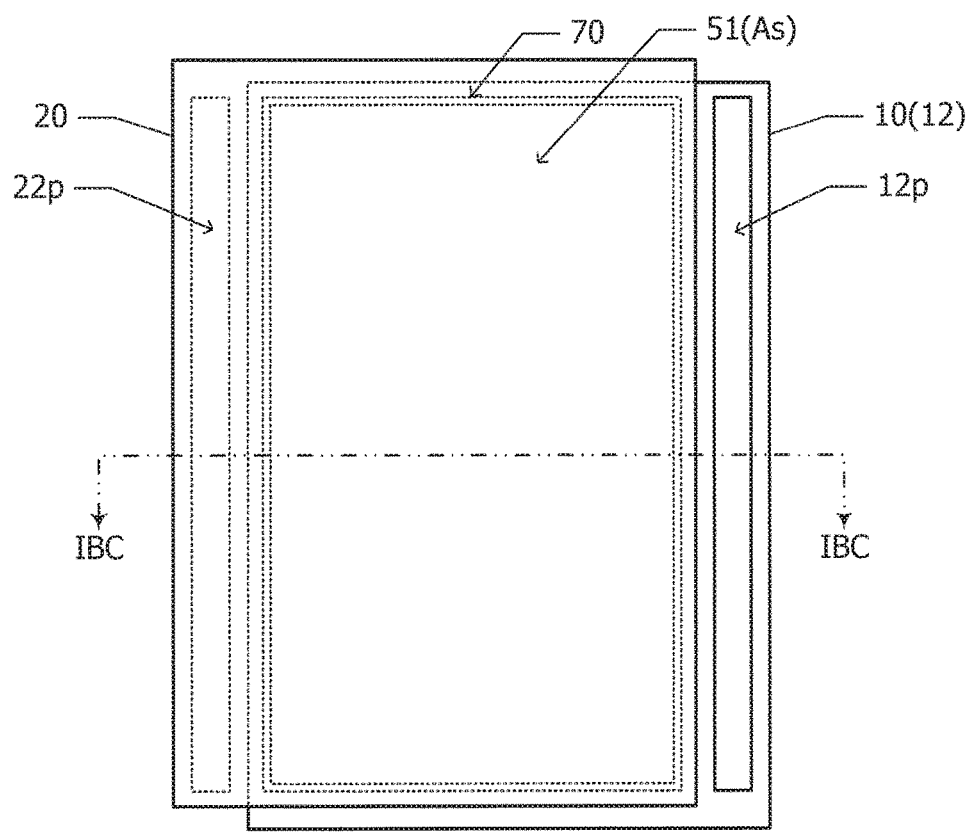
FIG. 1A to FIG. 1C are a plan view and sectional views of an electrodeposition element according to a reference example.
Figure 1B:
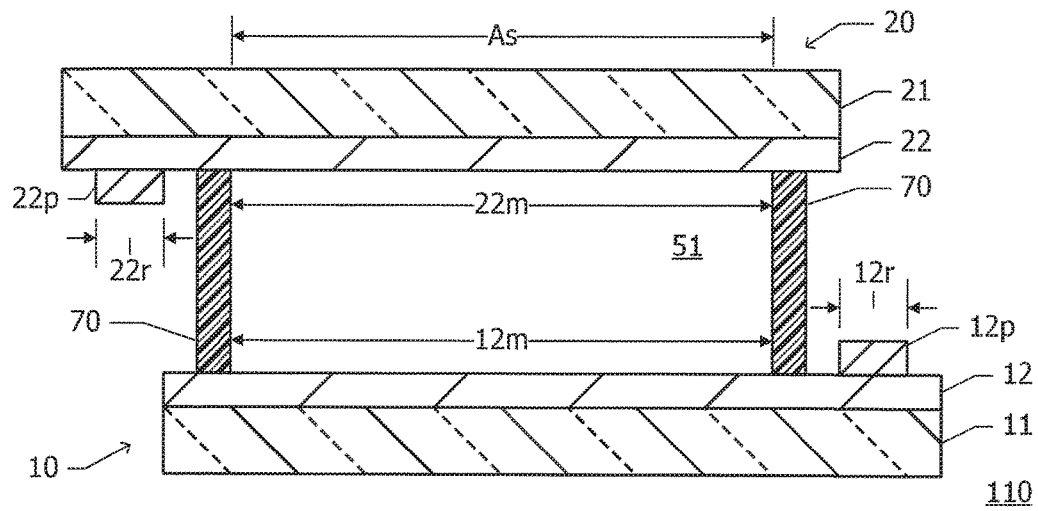
Figure 1C:
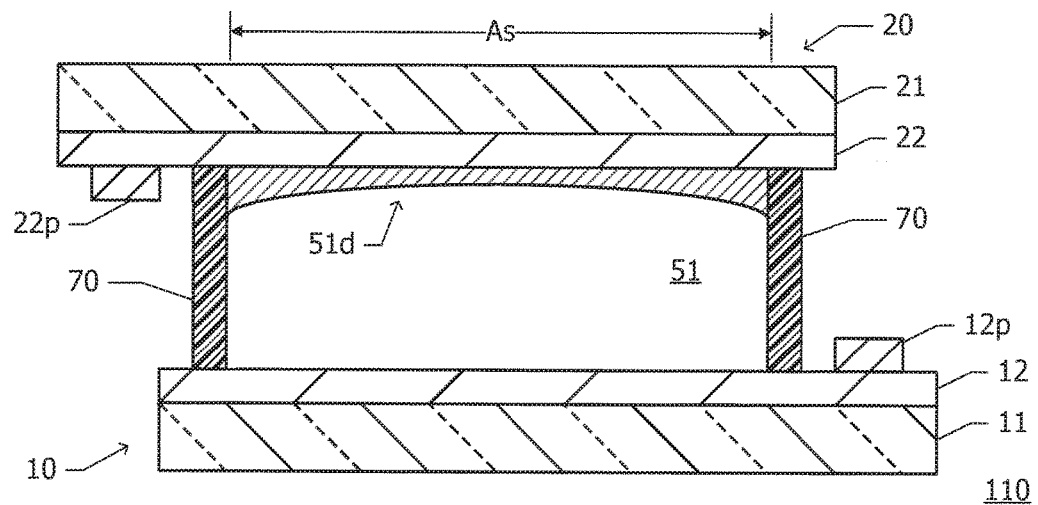

FIG. 1A to FIG. 1C area plan view and sectional views of an ED element 110 according to a reference example. The sectional views illustrated in FIG. 1B and FIG. 1C are taken along line IBC-IBC in FIG. 1A. The relative sizes or positional relationships of constituent members illustrated in the drawings are different from the actual ones.

As illustrated in FIG. 1A, the ED element 110 mainly includes a lower substrate 10, an upper substrate 20, an electrolyte layer (electrolyte solution) 51, and a seal frame member 70. The lower substrate 10 and the upper substrate 20 are arranged opposite each other, and the electrolyte layer (electrolyte solution) 51 and the seal frame member 70 are located between the lower and upper substrates 10 and 20. In FIG. 1A, a portion of the lower substrate 10 that is hidden behind the upper substrate 20 and the outline of the seal frame member 70 are indicated by broken lines.

Power supply connection electrodes 12p and 22p are disposed on opposing surfaces of the lower and upper substrates 10 and 20. The power supply connection electrodes 12p and 22p are connected to an external power supply. In FIG. 1A, the outline of the power supply connection electrode 22p on the upper substrate 20 is also indicated by a broken line. The power supply connection electrodes 12p and 22p are typically arranged outside the seal frame member 70 in such a manner as to face each other with the electrolyte layer 51 interposed therebetween.

The seal frame member 70 is disposed in an area where the lower and upper substrates 10 and 20 overlap each other so as to extend along the edge of the area. A space defined by the lower and upper substrates 10 and 20 and the seal frame member 70 is filled with the electrolyte solution 51. The area surrounded by the seal frame member 70 and filled with the electrolyte solution 51 is a switching area As where optical states can be switched. The area has an area of 12000 mm$^2$ (150 mm (vertical) by 80 mm (horizontal)), for example.

As illustrated in FIG. 1B, the lower substrate 10 has a structure in which a transparent electrode 12 overlies an entire surface of a support substrate 11. The upper substrate 20 has a structure in which a transparent electrode 22 overlies an entire surface of a support substrate 21. The transparent electrodes 12 and 22 are disposed so as to face each other.

The support substrates 11 and 21 are each implemented as a substrate that is optically transmissive, such as a glass substrate. The transparent electrodes 12 and 22 are each formed of a member that is optically transmissive and electrically conductive, such as an indium tin oxide (ITO) or indium zinc oxide (IZO) member. Here, the lower and upper substrates 10 and 20 are each implemented as a soda-lime glass substrate with 5 Ω/□ ITO.

The power supply connection electrode 12p is disposed on the surface of the lower electrode 12 outside the seal frame member 70. The power supply connection electrode 12p is connected to the external power supply (e.g., its positive terminal or ground terminal). The power supply connection electrode 22p is disposed on the surface of the upper electrode 22 outside the seal frame member 70. The power supply connection electrode 22p is connected to the external power supply (e.g., its negative terminal). The power supply connection electrodes 12p and 22p are each formed of a metal member such as silver with a lower electrical resistivity (higher electrical conductivity) than a transparent electrode of ITO or the like.

The transparent electrode 12 on the lower substrate 10 includes an area where the power supply connection electrode 12p is disposed, which is referred to as a low-resistance area 12r, and the remaining area, in particular, an area that is in contact with the electrolyte layer 51 (an area corresponding to the switching area As), which is referred to as a main area 12m. Also, the transparent electrode 22 on the upper substrate 20 includes an area where the power supply connection electrode 22p is disposed, which is referred to as a low-resistance area 22r, and the remaining area, in particular, an area that is in contact with the electrolyte layer 51 (an area corresponding to the switching area As), which is referred to as a main area 22m.

The seal frame member 70 is formed of a resin member or the like and is disposed in the plane of the lower or upper substrate 10 or 20 in such a manner as to have a closed shape along the edge of the lower or upper substrate 10 or 20 (see FIG. 1A). The spacing (cell gap) between the lower and upper substrates 10 and 20 is specified by the seal frame member 70 and a gap control agent (not illustrated). The spacing between the lower and upper substrates 10 and 20 is about 100 μm, for example.

The electrolyte layer (electrolyte solution) 51 is made by dissolving an electrodeposition (ED) material (e.g., silver) in a solvent. The electrolyte layer (electrolyte solution) 51 fills the space defined by the lower and upper substrates 10 and 20 and the seal frame member 70. The electrolyte layer 51 is approximately transparent. At steady state (while no voltage is applied), the ED element 110 realizes a light transmitting state in its entirety.

The electrolyte layer (electrolyte solution) 51 contains a solvent, an ED material, a supporting salt, a mediator, and so on. For example, the electrolyte layer (electrolyte solution) 51 is a mixture prepared by adding 350 mM of AgBr as an ED material, 1750 mM of LiCl as a supporting salt, and 30 mM of TaCl$_5$ as a mediator to dimethyl-sulfoxide (DMSO) as a solvent.

As illustrated in FIG. 1C, when a negative potential (e.g., −4 V) with respect to the potential of the lower electrode 12 is applied to the upper electrode 22, an oxidation-reduction reaction occurs on the surfaces of the electrodes 12 and 22, which causes the ED material (silver) in the electrolyte layer 51 to be precipitated and deposited on the surface of the upper electrode 22 to form a light reflecting film 51d. At this time, the ED element 110 (the switching area As) realizes a light reflecting state.

When the application of voltage is stopped, the ED material (the light reflecting film 51d) precipitated and deposited on the surface of the upper electrode 22 is again dissolved in the electrolyte layer (electrolyte solution) 51 and disappears from the surface of the upper electrode 22. The electrolyte layer 51 can be switched between the transparent state and the ED-material-precipitated state. Accordingly, the ED element 110 is capable of switching its optical state between the light transmitting state (while no voltage is applied) and the light reflecting state (while voltage is applied).

In the reference example, the light reflecting film 51d deposited on the surface of the upper electrode 22 has a non-uniform thickness. Specifically, the light reflecting film 51d has a relatively large thickness at both ends of the switching area As, which are close to the power supply connection electrodes 12p and 22p, whereas the light reflecting film 51d has a relatively small thickness in the center of the switching area As. Thus, in the light reflecting state, the light reflectance is relatively high at both ends of the switching area As, which are close to the power supply connection electrodes 12p and 22p, whereas the light reflectance is relatively low in the center of the switching area As.

The non-uniformity in thickness is caused by the distribution (variations) of current density in the electrolyte layer 51. The distribution (variations) of current density is more noticeable when the electrodes 12 and 22 are each formed of a member having a high electrical resistivity (low electrical conductivity), such as an ITO member, and when the width of the main areas 12m and 22m of the electrodes 12 and 22 (the width of the switching area As or the electrolyte layer 51) in a direction crossing between the power supply connection electrodes 12p and 22p is large (e.g., greater than or equal to 30 mm).

When the electrodes 12 and 22 have a high electrical resistivity (low electrical conductivity) and the width of the main areas 12m and 22m is large, the current density in the electrolyte layer 51 is relatively high in an area close to a current supply source and is relatively low in an area away from the current supply source. Since the amount of precipitation of an ED material (the thickness of a deposited film) is in proportion to the current density in an electrolyte layer, the thickness of the light reflecting film 51d is large at both ends of the switching area As, which are close to the current supply source, that is, which are close to the power supply connection electrodes 12p and 22p, whereas the thickness of the light reflecting film 51d is small in the center of the switching area As.

If the thickness of the light reflecting film 51d changes depending on the position, an optical characteristic (light reflectance) in an element surface also changes depending on the position. In general, an optical element preferably has a uniform optical characteristic across an element surface.

Figure 2A:
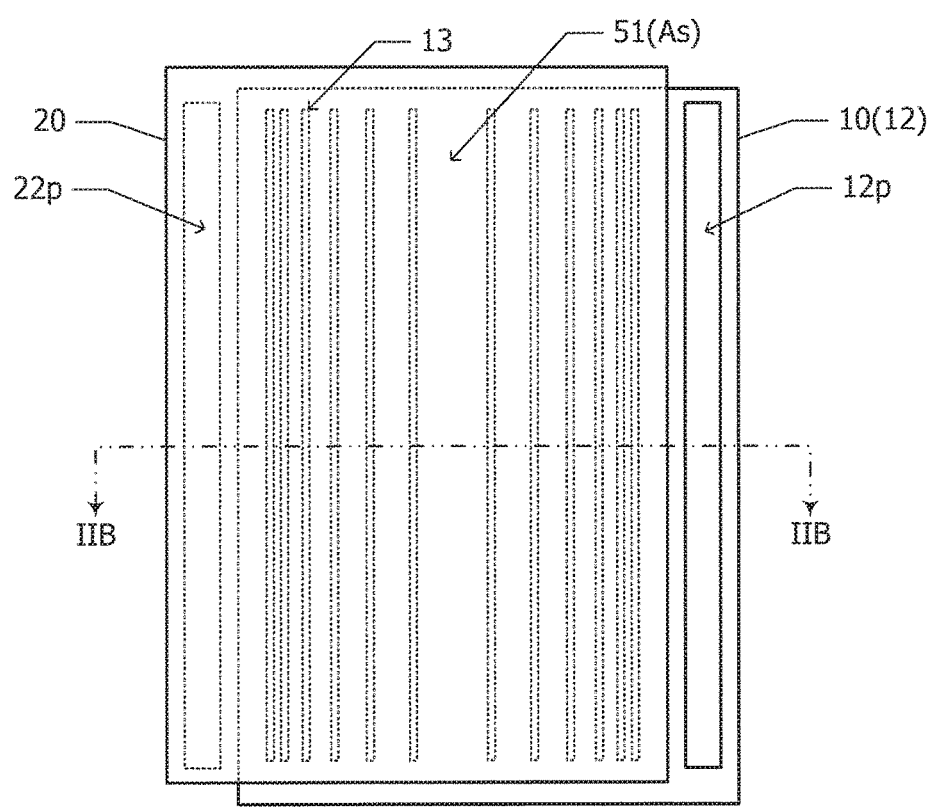
FIG. 2A to FIG. 2C are a plan view and sectional views of an electrodeposition element according to a first exemplary embodiment.
Figure 2B:
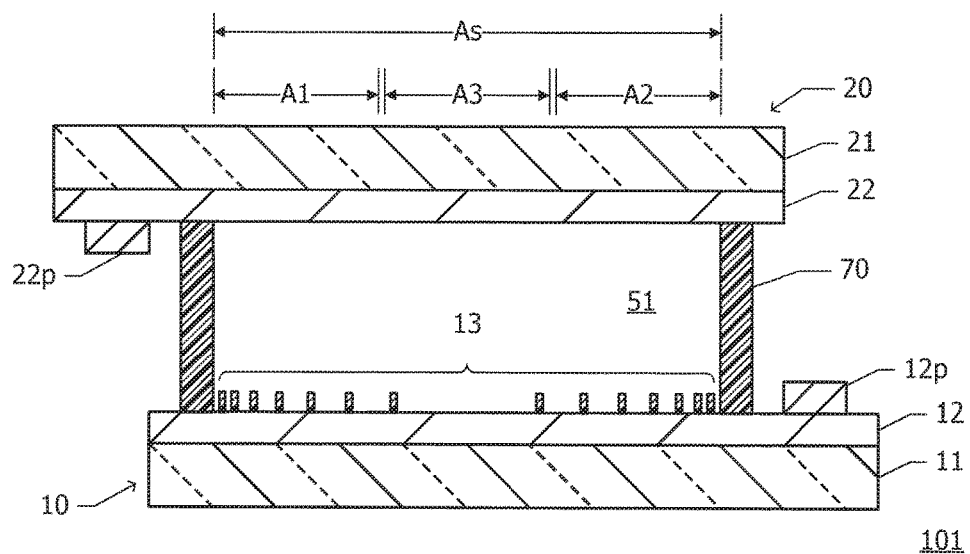

FIG. 2A and FIG. 2B are a plan view and a sectional view of an ED element 101 according to a first exemplary embodiment, respectively. The sectional view illustrated in FIG. 2B is taken along line IIB-IIB in FIG. 2A.

The ED element 101 according to the first exemplary embodiment basically has a structure similar to that of the ED element 110 according to the reference example (see FIG. 1). In the first exemplary embodiment, insulating members 13 are disposed in the main area 12m of the lower electrode 12.

As illustrated in FIG. 2A, the insulating members 13, each of which extends along the power supply connection electrodes 12p and 22p, are arranged side by side in a direction perpendicular to the extending direction (in the transverse direction or width direction of the ED element 101). In FIG. 2A, the outline of each of the insulating members 13 is indicated by a broken line. No seal frame member is depicted to avoid clutter.

Each of the insulating members 13 has a width of about 50 μm. The insulating members 13 are arranged densely at both ends of the switching area As, which are close to the power supply connection electrodes 12p and 22p, and are arranged sparsely in the center of the switching area As. The spacing between the insulating members 13 is a minimum of about 30 μm and a maximum of about 6 mm.

As illustrated in FIG. 2B, the insulating members 13 are disposed on a surface of an electrode on which no ED material is precipitated or deposited, here, on the surface of the lower electrode 12. Each of the insulating members 13 desirably has an index of refraction equivalent to the electrolyte layer 51 and preferably has an index of refraction in a range of ±0.15 of the index of refraction of the electrolyte layer 51. The insulating members 13 may be composed of $SiO_2$, for example. The insulating members 13 described above are less likely to be visible even when the insulating members 13 are arranged.

The switching area As has a subarea close to an electrode on which an ED material is precipitated and deposited, here, a subarea closer to the power supply connection electrode 22p connected to the upper electrode 22, which is defined as a first unit area A1. The switching area As also has a subarea away from the power supply connection electrode 22p connected to the upper electrode 22, which is defined as a second unit area A2. An area positioned in the middle between the first and second unit areas A1 and A2 is defined as a third unit area A3.

The proportion of the insulating members 13 in the first unit area A1 is higher than the proportion of the insulating members 13 in the third unit area A3. The proportion of the insulating members 13 in the second unit area A2 is also higher than the proportion of the insulating members 13 in the third unit area A3. The proportions of the insulating members 13 in the first and second unit areas A1 and A2 are substantially equivalent.

The insulating members 13 suppress the flow of current between the electrodes 12 and 22 or in the electrolyte layer 51. In the switching area As, the insulating members 13 are densely arranged within an area with relatively high current density and are sparsely arranged within an area with relatively low current density. This enables the current density in the electrolyte layer 51 to be uniform and also enables a deposited film of an ED material (the light reflecting film 51d, see FIG. 1C) to be uniform in thickness accordingly.

Figure 2C:
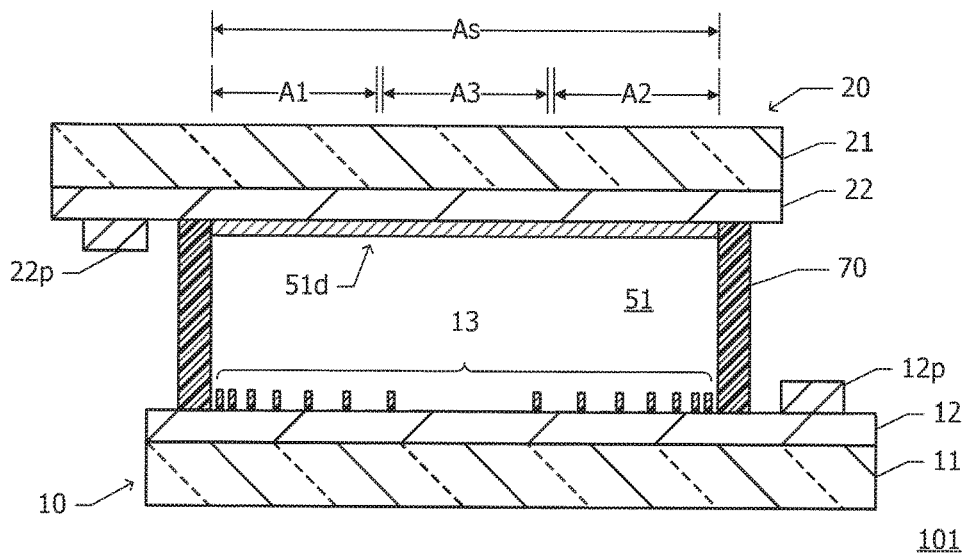

FIG. 2C is a sectional view of the ED element 101 with a deposited film 51d. The deposited film 51d is disposed continuously over both areas not overlapping the insulating members 13 when viewed in a normal direction and areas overlapping the insulating members 13 when viewed in the normal direction. There is no current flow to the electrolyte layer 51 in a portion of the electrode 12 that overlaps the insulating members 13 but the flow of current in the vicinity of the insulating members 13 affects an area that extends diagonally toward the electrode 22. Thus, the deposited film 51d is also formed in the areas overlapping the insulating members 13.

If the width of the insulating members 13 is too large, the electrolyte layer 51 may contain an area where completely no current flows. That is, the upper electrode 22 may contain an area where no deposited film of an ED material is formed. Thus, each of the insulating members 13 has preferably a width less than or equal to 1 mm.

Figure 3A:
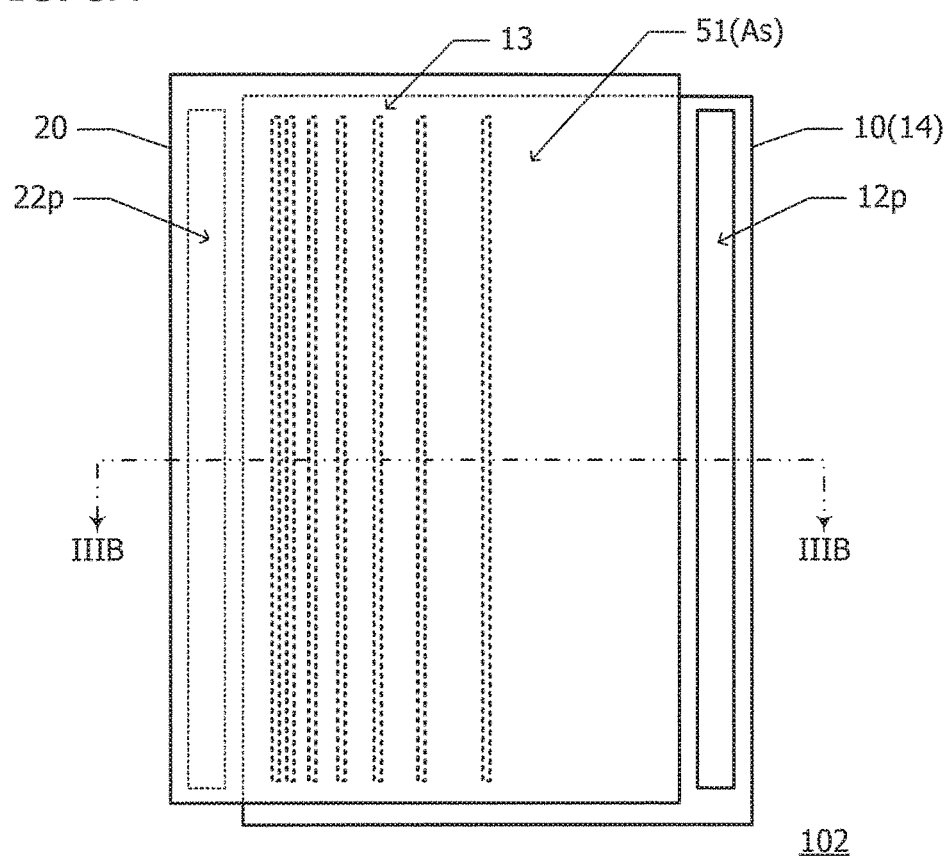
FIG. 3A to FIG. 3C are a plan view and sectional views of an electrodeposition element according to a second exemplary embodiment.
Figure 3B:
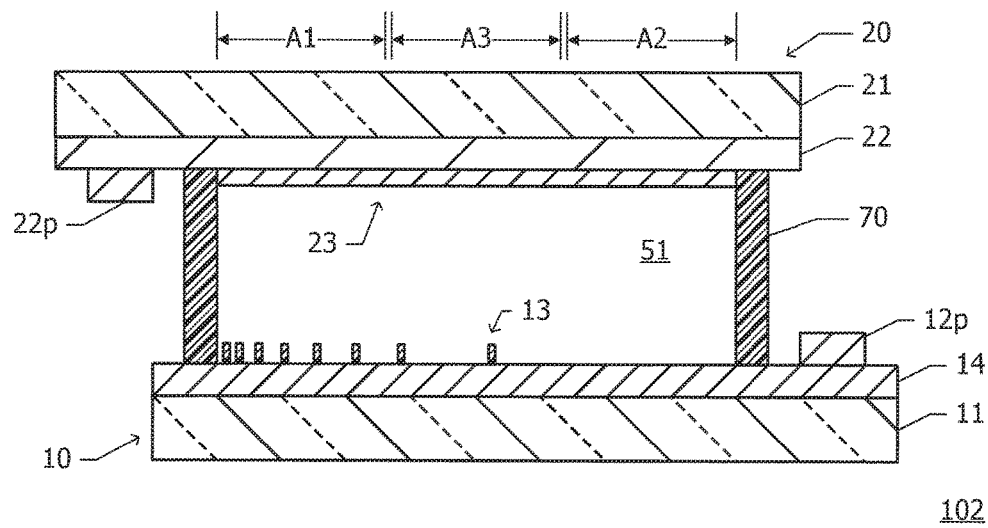

FIG. 3A and FIG. 3B are a plan view and a sectional view of an ED element 102 according to a second exemplary embodiment, respectively. The sectional view illustrated in FIG. 3B is taken along line IIIB-IIIB in FIG. 3A.

The ED element 102 according to the second exemplary embodiment basically has a structure similar to that of the ED element 101 according to the first exemplary embodiment (see FIGS. 2A to 2C). In the second exemplary embodiment, a lower electrode is implemented as, instead of a transparent electrode, a metal electrode 14 typically having a higher electrical conductivity than a transparent electrode of ITO or the like. In the second exemplary embodiment, accordingly, the insulating members 13 are arranged in a way (dense and sparse pattern) different from that in the first exemplary embodiment.

As illustrated in FIG. 3A, the insulating members 13 are densely arranged in an area close to the power supply connection electrode 22p and are sparsely arranged in an area away from the power supply connection electrode 22p. The proportion of the insulating members 13 in a unit area gradually decreases as the unit area is positioned away from the power supply connection electrode 22p.

The metal electrode 14, which is the lower electrode, may be composed of, for example, silver with high light reflectance. In this case, at steady state (while no voltage is applied), the ED element 102 realizes a light reflecting state in its entirety.

As illustrated in FIG. 3B, a decoration electrode 23 may be disposed on the surface of the upper electrode 22. The decoration electrode 23 is formed by, for example, deposition of nanometer-sized fine particles. The decoration electrode 23 has a finely uneven surface which is rougher than at least the surface of the transparent electrode 22. The fine particles forming the decoration electrode 23 include a member that is optically transmissive and electrically conductive, such as ITO.

When a negative potential with respect to the potential of the lower electrode 14 is applied to the upper electrode 22, a deposited film made of an ED material is formed on the surface of the decoration electrode 23. Since the surface of the decoration electrode 23 has irregularities of the order of nanometers, the deposited film also has fine irregularities of the order of nanometers. The deposited film having fine irregularities approximately absorbs visible light through plasmon absorption. In this case, the ED element 102 (the switching area As) realizes a light absorption state (black state). The ED element 102 is capable of switching its optical state between the light reflecting state (while no voltage is applied) and the light absorption state (while voltage is applied).

If the electrode 22 on which an ED material is precipitated and deposited (or the decoration electrode 23) has a relatively low electrical conductivity and the electrode 14 on which no ED material is precipitated or deposited has a relatively high electrical conductivity, the current density in the electrolyte layer 51 is relatively high in a subarea of the upper electrode 22 (the first unit area A1) close to the current supply source (the power supply connection electrode 22p) and is relatively low in a subarea of the upper electrode 22 (the second unit area A2) away from the current supply source.

In the ED element 102, the proportion of the insulating members 13 in the first unit area A1 is higher than the proportion of the insulating members 13 in the third unit area A3. Further, the proportion of the insulating members 13 in the third unit area A3 is higher than the proportion of the insulating members 13 in the second unit area A2. That is, the proportion of the insulating members 13 in a unit area gradually decreases as the unit area is positioned away from the power supply connection electrode 22p on the upper electrode 22 (the decoration electrode 23) on which an ED material is deposited.

In the switching area As, the insulating members 13 are densely arranged within an area with relatively high current density (the first unit area A1) and are sparsely arranged within an area with relatively low current density (the second unit area A2). This enables the current density in the electrolyte layer 51 to be uniform and also enables the deposited film of an ED material (the light reflecting film 51d, see FIG. 1C) to be uniform in thickness accordingly.

The distribution pattern of current density in an electrolyte layer can change in accordance with the electrical conductivity of the electrode, the cell gap, and so on. The arrangement (dense and sparse pattern) of insulating members is preferably determined on the basis of measurement results such as the current density in the electrolyte layer and the thickness of a deposited film or their computer simulation.

Figure 3C:
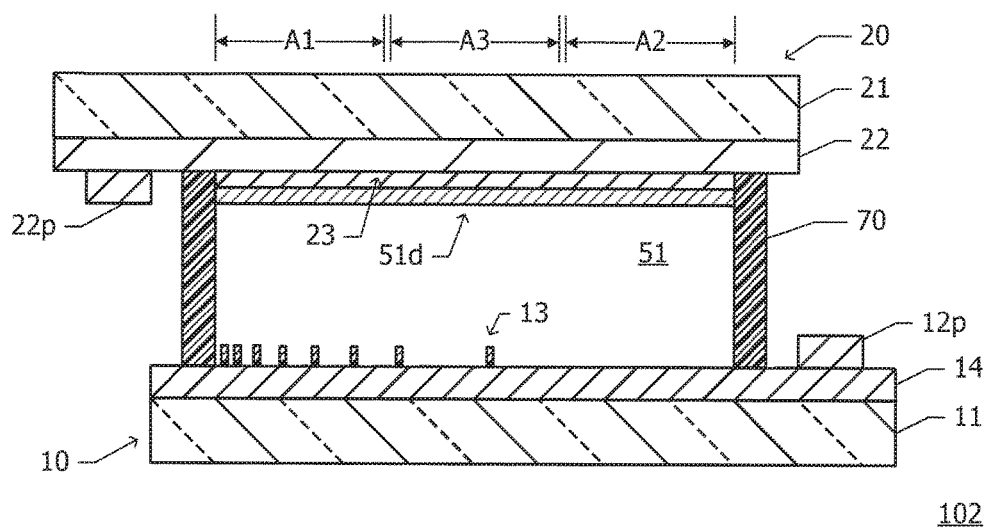

FIG. 3C is a sectional view of the ED element 102 with a deposited film 51d. The deposited film 51d is disposed continuously over both areas not overlapping the insulating members 13 when viewed in a normal direction and areas overlapping the insulating members 13 when viewed in the normal direction. There is no current flow to the electrolyte layer 51 in a portion of the electrode 14 that overlaps the insulating members 13 but the flow of current in the vicinity of the insulating members 13 affects an area that extends diagonally toward the decoration electrode 23. Thus, the deposited film 51d is also formed in the areas overlapping the insulating members 13.

Figure 4:
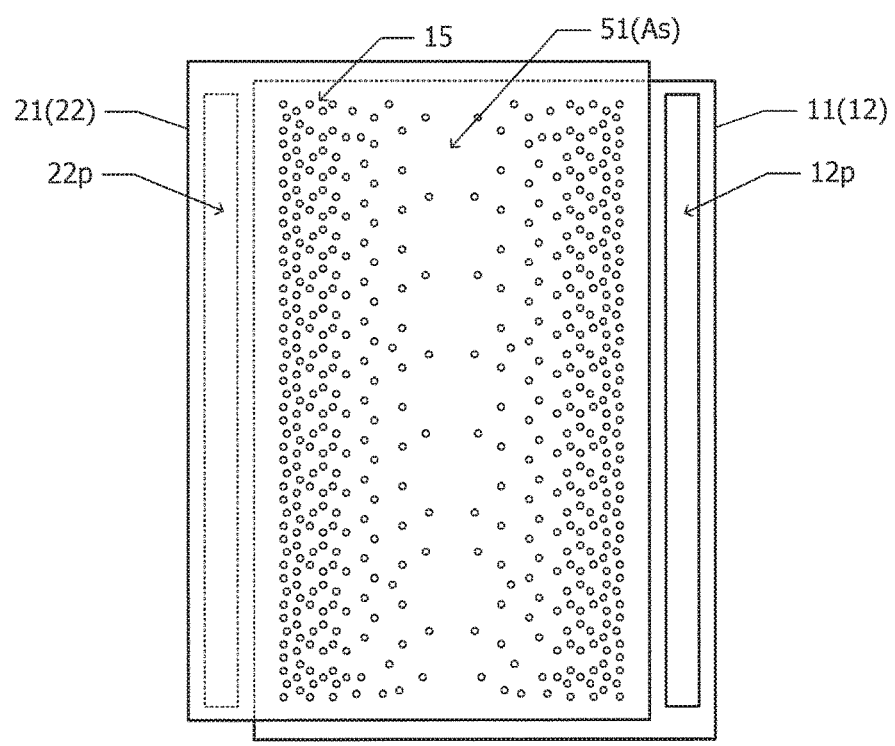
FIG. 4 is a plan view of an electrodeposition element according to a third exemplary embodiment.

FIG. 4 is a plan view of an ED element 103 according to a third exemplary embodiment. The ED element 103 according to the third exemplary embodiment basically has a structure similar to that of the ED element 101 according to the first exemplary embodiment (see FIGS. 2A to 2C). In the third exemplary embodiment, insulating members 15 each have a dot shape, rather than a bar shape, in plan view.

Each of the insulating members 15 has a dot shape having a diameter (or width) of about 50 µm, for example, in plan view. Even when the insulating members 15 have the shape described above, the insulating members 15 are densely arranged in an area with relatively high current density and are sparsely arranged in an area with relatively low current density, which enables a deposited film of an ED material to be uniform in thickness.

Figure 5A:
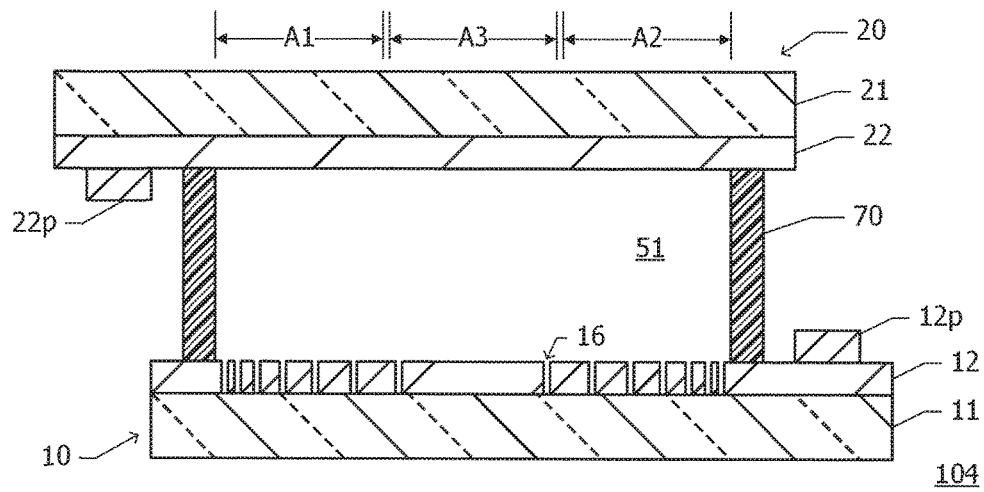
FIG. 5A and FIG. 5B are sectional views of an electrodeposition element according to a fourth exemplary embodiment.

FIG. 5A is a sectional view of an ED element 104 according to a fourth exemplary embodiment. The ED element 104 according to the fourth exemplary embodiment basically has a structure similar to that of the ED element 103 according to the third exemplary embodiment (see FIG. 4). In the ED element 104 according to the fourth exemplary embodiment, the lower electrode 12 has dot-shaped holes 16 (or grooves) and no insulating members are disposed on a surface of an electrode.

The holes 16 in the lower electrode 12, instead of insulating members, can also suppress current density in the electrolyte layer 51. Thus, the holes 16 are densely formed in an area with relatively high current density and are sparsely formed in an area with relatively low current density, which enables a deposited film of an ED material to be uniform in thickness.

Figure 5B:
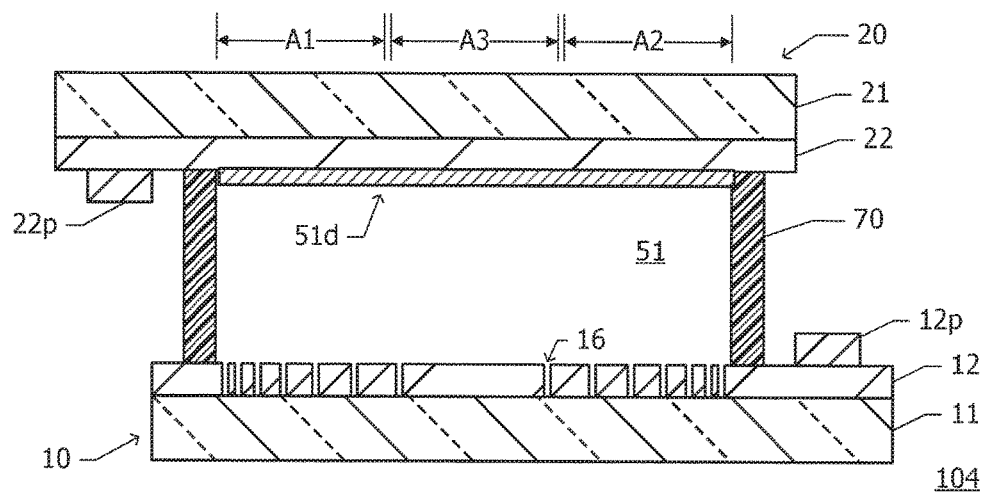

FIG. 5B is a sectional view of the ED element 104 with a deposited film 51d. The deposited film 51d is disposed continuously over both areas not overlapping the holes 16 when viewed in a normal direction and areas overlapping the holes 16 when viewed in the normal direction. There is no current flow to the electrolyte layer 51 in portions of the electrode 12 in which the holes 16 are formed but the flow of current in the vicinity of the holes 16 affects an area that extends diagonally toward the electrode 22. Thus, the deposited film 51d is also formed in the areas overlapping the holes 16.

While embodiments of the present invention have been described, the present invention is not limited to these embodiments. For example, an ED material in an electrolyte layer may be replaced with an electrochromic material (such as diacetylbenzene) or an electrochemical luminescent material (such as 9,10-diphenylanthracene), which enables an electrochromic (EC) element or an electrochemiluminescence (ECL) element to be manufactured.

In a configuration that does not include the insulating members 13 as illustrated in FIGS. 2A to 2C or the holes 16 as illustrated in FIGS. 5A and 5B, an EC element or an ECL element also has an uneven appearance of color or light that occurs in the vicinity of a power supply connection electrode due to a strong reaction. Such an element that may have a distribution (variations) of current density in an electrolyte layer is provided with insulating areas such as insulating members or holes that are arranged sparsely and densely, thereby achieving uniformity of current density. Consequently, the EC element can achieve a uniform tone of color in an element surface and the ECL element can achieve a uniform intensity of light in an element surface. Also in the EC element or the ECL element, the size of the insulating members 13 or the holes 16 is selected such that an oblique electric field produces light or color even in an area where the insulating members 13 or the holes 16 are present when viewed in a normal direction.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. An optical element comprising:
a first substrate that is optically transmissive;
a second substrate facing the first substrate;
a first electrode disposed on a surface of the first substrate, the surface facing the second substrate, the first electrode being a light-transmitting electrode;
a second electrode disposed on a surface of the second substrate, the surface facing the first substrate, the second electrode partially including insulating areas;
a seal frame member located between the first electrode and the second electrode, the seal frame member having a frame shape when viewed in a direction normal to the first substrate and the second substrate;
an electrolyte layer that fills a space defined by the first substrate, the second substrate, and the seal frame member, an optical state of the electrolyte layer being capable of changing due to an electrochemical reaction on a surface of the first electrode and a surface of the second electrode;
a first connection electrode disposed outside the seal frame member on the surface of the first substrate facing the second substrate, the first connection electrode being connected to the first electrode, the first connection electrode having a lower electrical resistivity than the first electrode; and
a second connection electrode disposed outside the seal frame member on the surface of the second substrate facing the first substrate, the second connection electrode being connected to the second electrode,
wherein, when viewed in the direction normal to the first substrate and the second substrate, in an area surrounded by the seal frame member, a proportion of the insulating areas of the second electrode included in an unit area relatively close to the first connection electrode is higher than that included in an unit area positioned in the middle of the seal frame member.

2. The optical element according to claim 1, wherein, when viewed in the direction normal to the first substrate and the second substrate,
the first connection electrode and the second connection electrode are arranged opposite each other with the seal frame member and the electrolyte layer interposed therebetween, and
the area surrounded by the seal frame member includes a first unit area, a second unit area, and a third unit area along an imaginary straight line crossing the first connection electrode and the second connection electrode, the first unit area being located relatively close to the first connection electrode, the second unit area being located relatively far away from the first connection electrode, the third unit area being positioned in a middle between the first unit area and the second unit area, and a proportion of the insulating areas included in the first unit area is higher than that included in the third unit area.

3. The optical element according to claim 2, wherein a proportion of the insulating areas included in the second unit area is higher than that included in the third unit area.

4. The optical element according to claim 3, wherein the second electrode includes a light-transmitting member.

5. The optical element according to claim 2, wherein a proportion of insulating areas included in the second unit area is lower than that included in the third unit area.

6. The optical element according to claim 5, wherein the second electrode includes a light-reflecting metal member.

7. The optical element according to claim 1, wherein the second electrode includes an electrically conductive layer disposed on the surface of the second substrate, and insulating members disposed on a surface of the electrically conductive layer, the insulating members forming the insulating areas.

8. The optical element according to claim 7, wherein a difference between refractive indexes of the insulating members and the electrolyte layer is less than 0.15.

9. The optical element according to claim 1, wherein the second electrode includes an electrically conductive layer having holes that form the insulating areas.

10. The optical element according to claim 1, wherein each of the insulating areas included in the second electrode has a width less than or equal to 1 mm.

* * * * *